(12) United States Patent
Malik et al.

(10) Patent No.: US 7,518,264 B1
(45) Date of Patent: Apr. 14, 2009

(54) DIGITAL CURRENT SHARE METHOD FOR POWER SUPPLIES IN PARALLEL

(75) Inventors: Randhir Malik, Cary, NC (US); Eino Alfred Lindfors, Raleigh, NC (US); Cecil Charles Dishman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/128,949

(22) Filed: May 29, 2008

(51) Int. Cl.
  *H02J 1/10* (2006.01)
  *H02M 7/00* (2006.01)
(52) U.S. Cl. .............................. 307/43; 307/52; 363/65
(58) Field of Classification Search ................. 323/241, 323/274, 275, 267, 284, 283; 307/43, 52, 307/82; 341/155; 363/65
  See application file for complete search history.

(56) References Cited

U.S. PATENT DOCUMENTS

| 5,428,524 | A | | 6/1995 | Massie |
| 5,594,286 | A | * | 1/1997 | Tachikawa .................... 307/43 |
| 5,724,237 | A | * | 3/1998 | Hunter ......................... 363/65 |
| 6,788,036 | B1 | | 9/2004 | Milavec et al. |
| 7,027,944 | B2 | * | 4/2006 | Tabaian et al. .............. 702/106 |
| 2008/0265680 | A1 | * | 10/2008 | Marwali et al. ............... 307/43 |

* cited by examiner

*Primary Examiner*—Jessica Han
(74) *Attorney, Agent, or Firm*—The Law Firm of Andrea Hence Evans, LLC

(57) ABSTRACT

The present invention relates to a digital current share apparatus and method for supplies in parallel wherein a digital current sharing is used to eliminate oscillations during current sharing by raising current in steps until the currents in power supplies in parallel are brought within a certain tolerance of one another.

1 Claim, 2 Drawing Sheets

DIGITAL CURRENT SHARE METHOD FOR POWER SUPPLIES IN PARALLEL

CROSS REFERENCE TO RELATED APPLICATIONS

There are no cross-references related to this application.

FIELD OF THE INVENTION

The present invention relates to a digital current share apparatus and method for supplies in parallel. More particularly, the present invention relates to using a digital current sharing to eliminate oscillations during current sharing by raising current in steps until the currents in power supplies in parallel are brought within a certain tolerance of one another. Relevant potential applications for this invention include power supplies used in parallel or redundant mode.

BACKGROUND OF THE INVENTION

The analogue current share method uses linear control to match the currents in power supplies or other circuits that are connected in parallel. Under these conditions, it is difficult to match the currents without current oscillations. Also, the response time to match the currents is extremely slow because the current share loop response is selected to be at least 10× lower than the voltage loop. The above conditions make it difficult to match power supplies from two different manufacturers with different voltage loop and current loop designs.

Despite these and other efforts in the art, still further improvements in Current share methods and apparatus thereof would be desirable.

SUMMARY OF THE INVENTION

An aspect of an embodiment of the present invention provides a method of using digital current sharing to eliminate the oscillations during current sharing by providing a first power supply that is carrying current. The first power supply is forced to raise its current in steps until the currents of the first power supply and that of a second power supply, which is in parallel with the first power supply, are brought within a certain tolerance of one another. The digital method can use software and hardware to shape the trajectory of the matching current and can discontinue the digital current sharing when the current of the first power supply reaches within a specified current tolerance with the current of the second power supply.

Additional aspects, objectives, features and aims of the present invention will become apparent from the following description of the preferred embodiments with reference to the attached drawings.

DETAILED DESCRIPTION OF THE INVENTION

Figure 1:
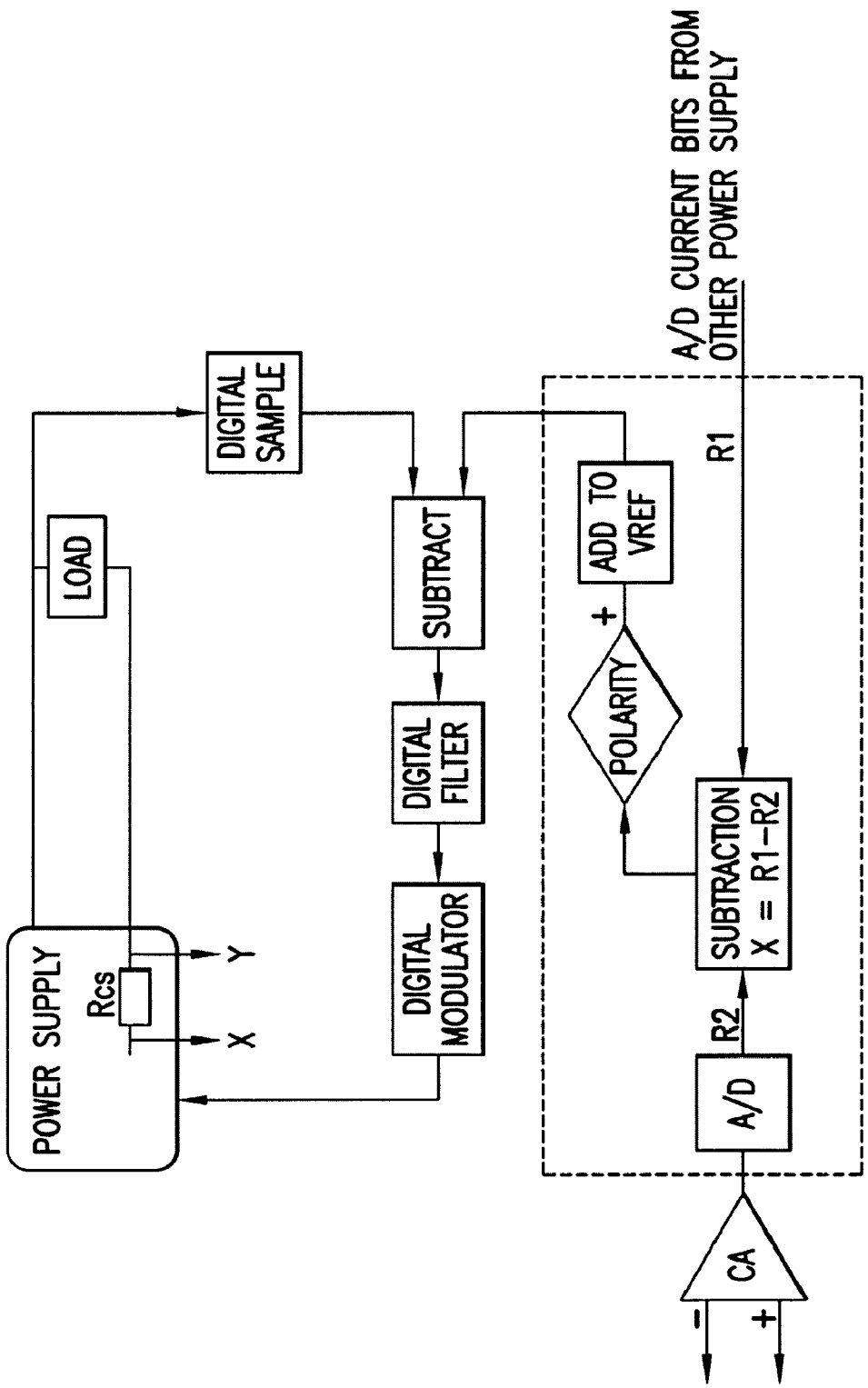
FIG. 1 illustrates a current share apparatus and method, in accordance with the embodiments of the present invention.

In accordance with embodiments of the present invention, FIG. 1 illustrates the current supplied by a first power supply develops a voltage across current sense resistor Rcs. This voltage is amplified by a current sense amplifier CA. The output of CA is digitized by A/D converter and applied to a subtraction circuit. Here register R2 contains the contents of the power supply under test. The digitized current from a second power supply which is in parallel with the first power supply is loaded in register R1. In other words, the load current has been converted into a digital form (i.e. a string of bits, binary values of 0 and 1). Alternatively, in an analog approach, usually an analog representation of the load current is shared with the other power supply. If the output of the subtraction circuit is positive, the output is added to the digitized reference of the first power supply. As the total sum is higher than the previous value, the net output of the other subtraction circuit will be higher and thus will generate a higher duty cycle by digital modulator and thus a higher output voltage. This process happens in steps and therefore will gracefully converge to stable shared currents among the different power supplies in parallel.

Figure 2A:
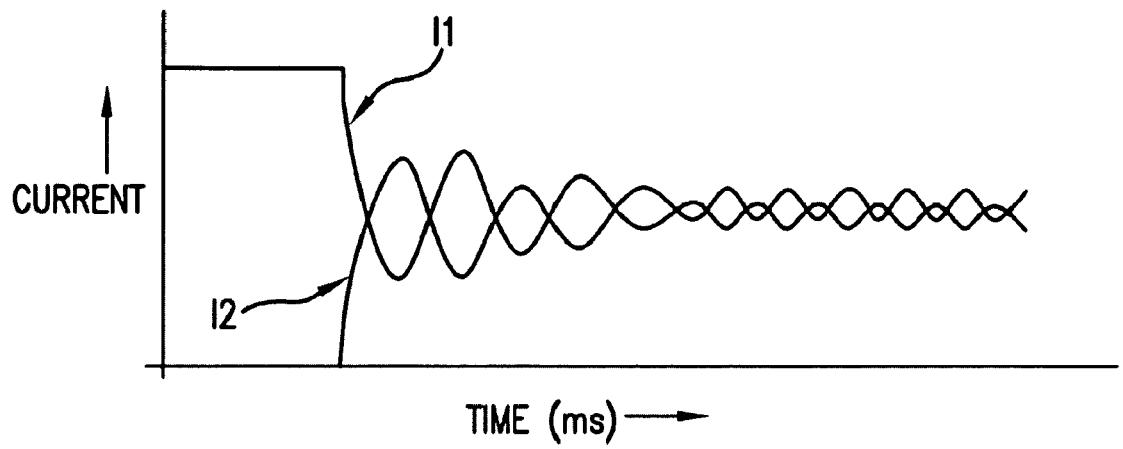
FIG. 2a illustrates an analog current share response time between two power supplies, in accordance with the embodiments of the present invention.
Figure 2B:
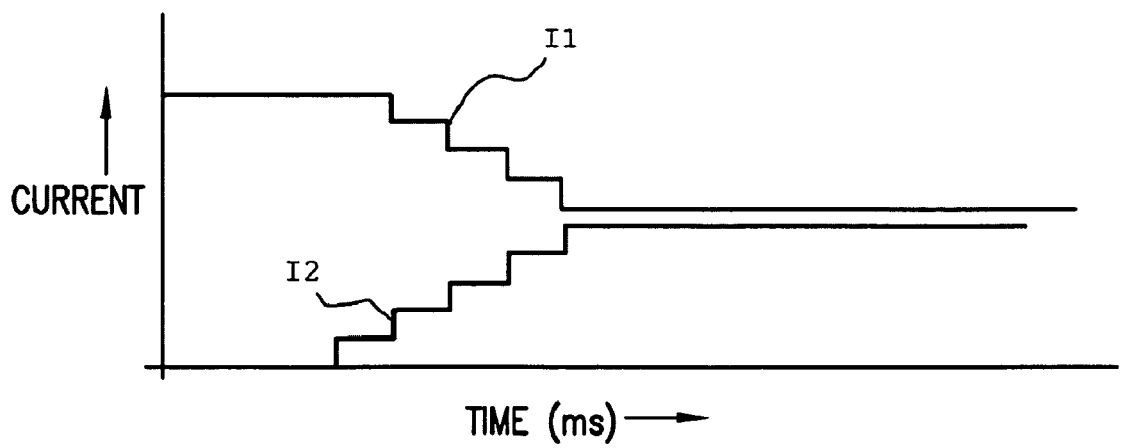
FIG. 2b illustrates a digital current sharing response time between two power supplies, in accordance with the embodiments of the present invention.

In accordance with an aspect of an embodiment of the present invention, FIG. 2a illustrates an analogue current sharing response time between two power supplies. Regarding FIG. 2a, element I1 is a graphical representation of the load current for a first power supply. Further, regarding FIG. 2a, element I2 is a graphical representation of the load current for a second power supply. Further, FIG. 2b illustrates a digital current sharing response time between two power supplies. Regarding FIG. 2b, element I1 is a graphical representation of the load current for a first power supply. Further, regarding FIG. 2b, element I2 is a graphical representation of the load current for a second power supply. Furthermore, FIG. 2b illustrates using a digital current sharing to eliminate the oscillations during current sharing because the power supply that is carrying lower current will be forced to raise its current in steps until the currents in power supplies in parallel are brought within a certain tolerance of one another. The digital method can use software and hardware to shape the trajectory of the matching current and can discontinue sharing when the lower current reaches within a specified current tolerance of the unit carrying higher current. This feature is hard to be implemented using analogue circuits.

The invention has been described in detail with particular reference to certain preferred embodiments thereof, but it will be understood that variations and modifications can be effected within the spirit and scope of the invention.

The invention claimed is:

1. A method of digital current sharing comprising:
   using digital current sharing to eliminate oscillations during current sharing by providing a first power supply that is carrying current:
   forcing said first power supply to raise its current in steps until the currents of said first power supply and that of a second power supply are brought within a certain matching current tolerance of one another by digitizing the currents of said first power supply and said second power supply, applying both digitized currents to a subtraction circuit and adding the positive output of said subtraction circuit to a digitized reference of said first power supply, wherein said second power supply is in parallel with said first power supply,
   using software and hardware to shape a trajectory of said matching current; and
   discontinuing said digital current sharing when the current of said first power supply reaches within a specified current tolerance with the current of said second power supply.

* * * * *